(12) United States Patent
Lee (10) Patent No.: US 12,531,309 B2
(45) Date of Patent: Jan. 20, 2026

(54) POUCH-TYPE SECONDARY BATTERY WITH SUPPORT FOR ELECTRODE LEAD

(71) Applicant: LG Energy Solution, Ltd., Seoul (KR)

(72) Inventor: Bum Hee Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/877,428

(22) PCT Filed: Jul. 4, 2023

(86) PCT No.: PCT/KR2023/009424
§ 371 (c)(1),
(2) Date: Dec. 20, 2024

(87) PCT Pub. No.: WO2024/010339
PCT Pub. Date: Jan. 11, 2024

(65) Prior Publication Data
US 2025/0174823 A1  May 29, 2025

(30) Foreign Application Priority Data

Jul. 4, 2022 (KR) .................. 10-2022-0082077

(51) Int. Cl.
*H01M 50/40* (2021.01)
*H01M 10/48* (2006.01)
(Continued)

(52) U.S. Cl.
CPC ......... *H01M 50/40* (2021.01); *H01M 10/486* (2013.01); *H01M 10/613* (2015.04); *H01M 10/647* (2015.04); *H01M 10/6556* (2015.04); *H01M 10/6567* (2015.04); *H01M 50/105* (2021.01); *H01M 50/54* (2021.01)

(58) Field of Classification Search
CPC .... H01M 50/40; H01M 50/105; H01M 50/54; H01M 10/613; H01M 10/647; H01M 10/6556; H01M 10/6567; H01M 10/486
See application file for complete search history.

(56) References Cited

U.S. PATENT DOCUMENTS

2011/0256436 A1\* 10/2011 Eo .................. H01M 50/197
429/94
2012/0308879 A1   12/2012 Kim et al.
(Continued)

FOREIGN PATENT DOCUMENTS

CN    110770932 A    2/2020
JP    2009016275 A   1/2009
(Continued)

OTHER PUBLICATIONS

JP 4751500 English Translation (Year: 2011).\*
(Continued)

*Primary Examiner* — Jimmy Vo
(74) *Attorney, Agent, or Firm* — Lerner David LLP (57) ABSTRACT

A secondary battery having an electrode assembly in which electrodes and separators are alternatively stacked; a pouch in which the electrode assembly is accommodated; a plurality of electrode leads connected to side portions of the electrode assembly and extending outside of the pouch; and a support configured to connect the plurality of electrode leads.

15 Claims, 8 Drawing Sheets

(51) Int. Cl.
    *H01M 10/613* (2014.01)
    *H01M 10/647* (2014.01)
    *H01M 10/6556* (2014.01)
    *H01M 10/6567* (2014.01)
    *H01M 50/105* (2021.01)
    *H01M 50/54* (2021.01)

(56) References Cited

U.S. PATENT DOCUMENTS

| | | | |
|---|---|---|---|
| 2013/0071712 A1 * | 3/2013 | Sasaki | H01M 6/12 |
| | | | 429/94 |
| 2013/0224562 A1 | 8/2013 | Momo | |
| 2015/0072191 A1 | 3/2015 | Lee et al. | |
| 2015/0072216 A1 | 3/2015 | Yun et al. | |
| 2016/0064782 A1 | 3/2016 | Lee et al. | |
| 2018/0219207 A1 | 8/2018 | Ko et al. | |
| 2019/0013509 A1 | 1/2019 | Park et al. | |
| 2020/0127246 A1 | 4/2020 | Choi et al. | |
| 2021/0184292 A1 | 6/2021 | Park et al. | |

FOREIGN PATENT DOCUMENTS

| | | | |
|---|---|---|---|
| JP | 4751500 B2 * | 8/2011 | |
| JP | 5380798 B2 | 1/2014 | |
| JP | 2019091723 A | 6/2019 | |
| JP | 2020009632 A | 1/2020 | |
| KR | 2008-0019311 A | 3/2008 | |
| KR | 101073010 B1 | 10/2011 | |
| KR | 2012-0134470 A | 12/2012 | |
| KR | 2013-0035754 A | 4/2013 | |
| KR | 20130050616 A | 5/2013 | |
| KR | 2013-0138893 A | 12/2013 | |
| KR | 2014-0144586 A | 12/2014 | |
| KR | 2015-0045240 A | 4/2015 | |
| KR | 2017-0086766 A | 7/2017 | |
| KR | 2019-0005296 A | 1/2019 | |
| KR | 2019-0138564 A | 12/2019 | |
| KR | 2019-0142973 A | 12/2019 | |
| KR | 102083656 B1 | 3/2020 | |
| WO | WO-2008125257 A1 * | 10/2008 | H01M 10/0431 |

OTHER PUBLICATIONS

WO 2008125257 English Translation (Year: 2008).*
International Search Report and Written Opinion for Application No. PCT/KR2023/009424 mailed Oct. 22, 2023. 6 pgs.
Search Report dated Apr. 1, 2025 from the Office Action for Chinese Application No. 202380047689.0 Issued Apr. 6, 2025, pp. 1-3.
Extended European Search Report including Written Opinion for Application No. 23835805.5 dated Sep. 10, 2025, pp. 1-10.

* cited by examiner

POUCH-TYPE SECONDARY BATTERY WITH SUPPORT FOR ELECTRODE LEAD

CROSS-REFERENCE TO RELATED APPLICATIONS

The present application is a 371 National Stage entry of PCT/KR2023/009424 filed on Jul. 4, 2023, which claims the benefit of foreign priority of Korean Patent Application No. 10-2022-0082077, filed on Jul. 4, 2022, which disclosures are hereby incorporated by reference in their entirety.

TECHNICAL FIELD

The present disclosure relates to a secondary battery.

BACKGROUND

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. The secondary battery accommodates an electrode assembly and an electrolyte. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, small weight, easy shape deformation, and the like, and thus, its usage is gradually increasing.

Referring to the structure of the pouch cell, an outer appearance of the pouch and a lead may be relatively firmly coupled to each other in a sealed shape. On the other hand, the internal electrode and the lead are coupled to each other by welding between each tab attached to the electrode and the lead. However, the connected portion between the tab and lead, which supports a body of the electrode, may gradually weaken in durability due to use environments such as vibration and impacts by the advancement of technology, in which the tab becoming thinner and the number of mono-cell stacks, which increases due to high capacity.

That is, the body is supported only by the tab welding between the electrode and the lead without a separate support structure, and thus there is a limitation in durability, resulting from use environments such as the vibration and impacts.

SUMMARY

Technical Problem

One aspect of the present disclosure is to provide a secondary battery capable of firmly supporting an electrode assembly under use environments such vibration and impacts.

Another aspect of the present disclosure is to provide a secondary battery capable of effectively managing an internal temperature thereof.

Technical Solution

A secondary battery according to the present disclosure may include: an electrode assembly in which electrodes and separators are alternatively stacked; a pouch in which the electrode assembly is accommodated; a plurality of electrode leads connected to both side portions of the electrode assembly, respectively, to extend to the outside of the pouch; and a support configured to connect the plurality of electrode leads.

In addition, a battery pack according to an aspect of the present disclosure may include the secondary battery according to an aspect of the present disclosure.

Advantageous Effects

According to the present disclosure, the support supporting the electrode assembly may be provided to firmly support the electrode assembly under the use environments such as the vibration and impacts, and thus, the durability may be enhanced. Here, both the ends of the support may be connected to the plurality of electrode leads to more firmly support the electrode assembly.

In addition, the support may transfer the heat generated in the electrode assembly to the electrode lead to cool the surroundings through the heat dissipation, in which the heat is transferred through the electrode lead to the outside.

In addition, the coolant may be accommodated in the support to cool the surroundings. In addition, the support may be provided with the temperature sensor that senses the surrounding temperature to effectively manage the internal temperature.

DETAILED DESCRIPTION

The reference characters used in the present disclosure are as follows:
100, 200: Secondary battery
110: Pouch
110a: Upper case
110b: Lower case
111: Body
111a: Accommodation part
112: Sealing part
120: Electrode assembly
121: Positive electrode
122: Negative electrode
123: Electrodes
124: Separator
130: Electrode tabs
131: Positive electrode tab
132: Negative electrode tab
140: Electrode leads
141: Positive electrode lead
142: Negative electrode lead
150, 250: Support
151: Accommodation space
160: Temperature sensor(s)
161: First temperature sensor
162: Second temperature sensor
163: Third temperature sensor
252: Through-hole(s)

The objectives, specific advantages, and novel features of the present disclosure will become more apparent from the following detailed description taken in conjunction with the accompanying drawings. It should be noted that the reference numerals are added to the components of the drawings in the present specification with the same numerals when possible, even if they are illustrated in other drawings. Also, the present disclosure may take different forms and should not be construed as limited to the aspects set forth herein. In the following description of the present disclosure, the detailed descriptions of related arts which may unnecessarily obscure the gist of the present disclosure will be omitted.

Secondary Battery According to First Aspect

Figure 1:
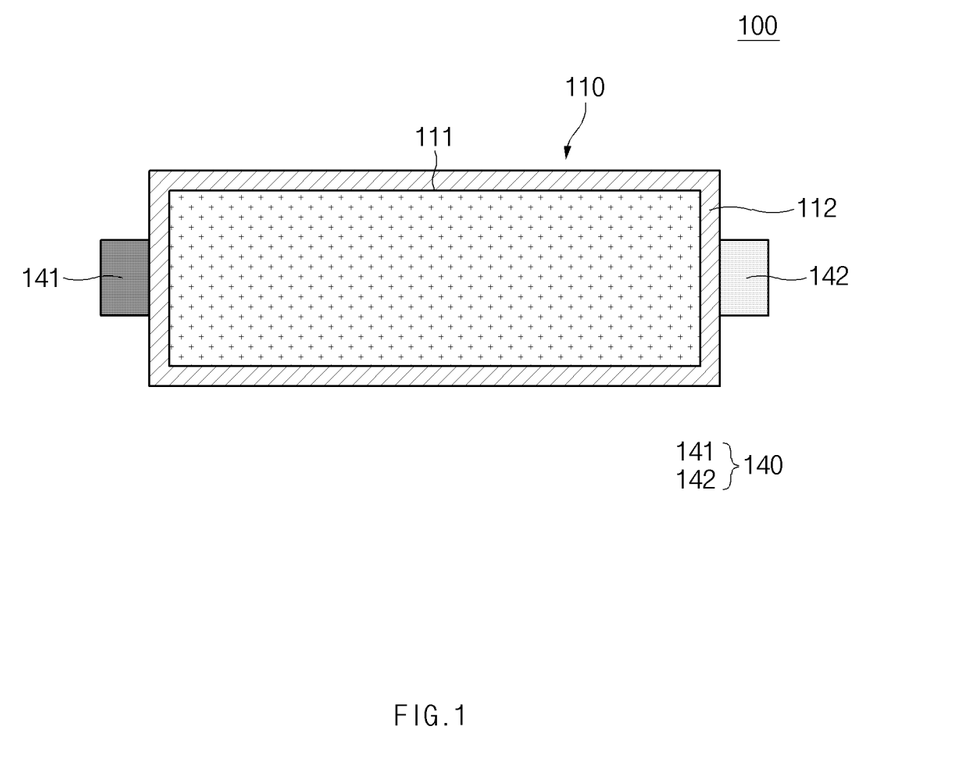
FIG. 1 is a plan view of a secondary battery according to a first aspect of the present disclosure.
Figure 2:
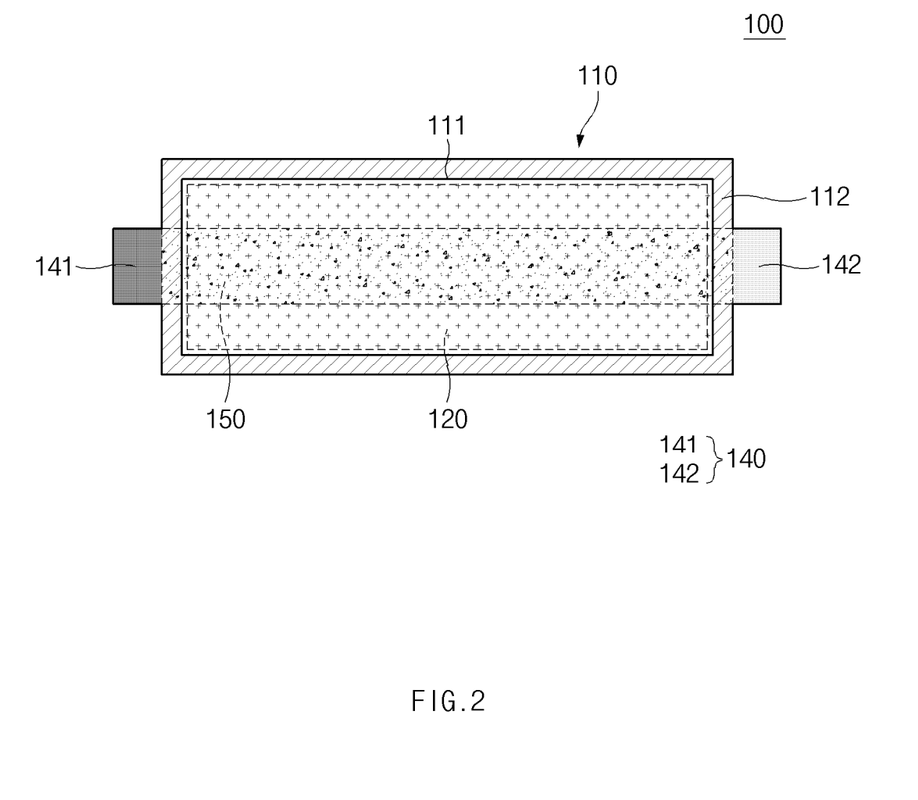
FIG. 2 is a plan view illustrating an example of the inside of a secondary battery according to a first aspect of the present disclosure.
Figure 3:
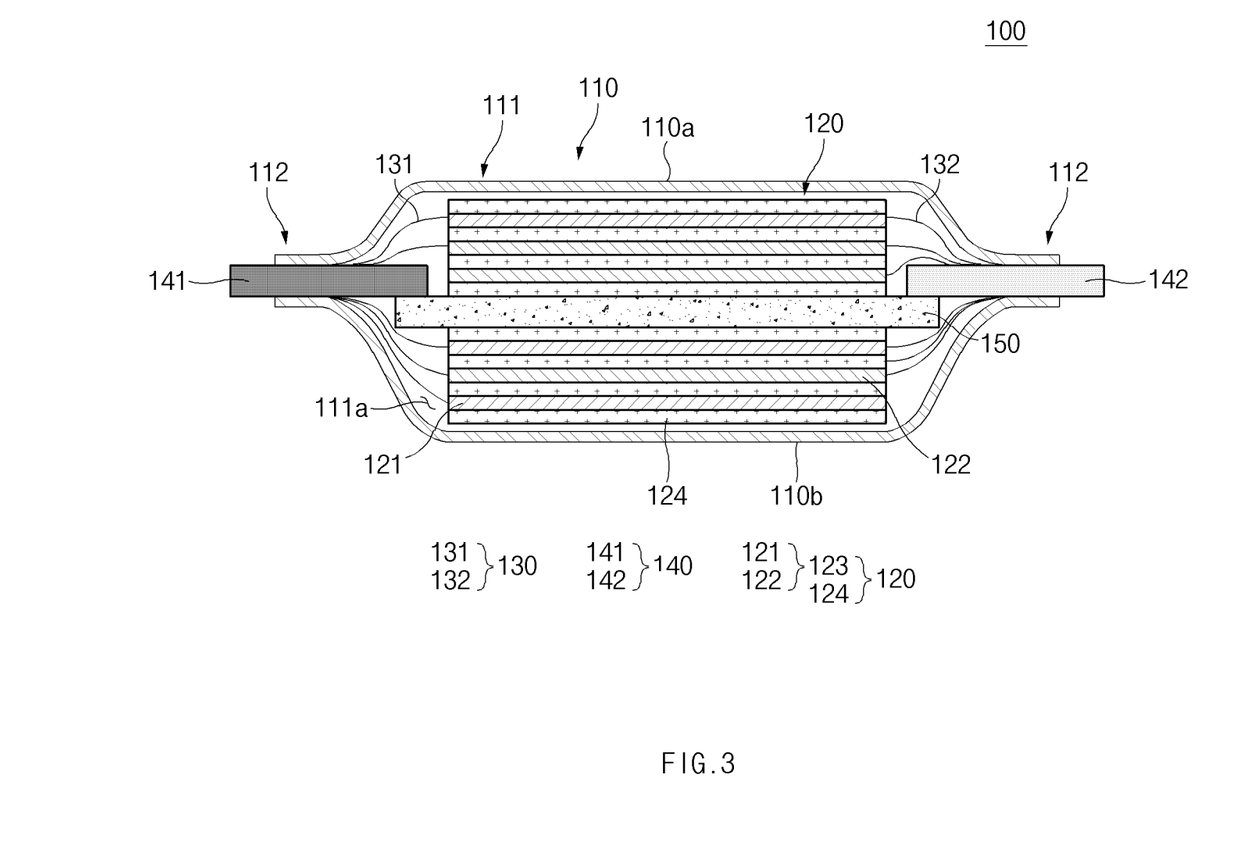
FIG. 3 is a side cross-sectional view illustrating a main part of the secondary battery according to the first aspect of the present disclosure.

FIG. 1 is a plan view of a secondary battery according to a first aspect of the present disclosure, FIG. 2 is a plan view illustrating an example of the inside of a secondary battery according to the first aspect of the present disclosure, and FIG. 3 is a side cross-sectional view illustrating a main part of the secondary battery according to the first aspect of the present disclosure.

Referring to FIGS. 1 to 3, a secondary battery 100 according to the first aspect of the present disclosure includes an electrode assembly 120, a pouch 110 in which the electrode assembly 120 is accommodated, a plurality of electrode leads 140 connected to the electrode assembly 120 to extend to the outside of the pouch 110, and a support 150 connected to the plurality of electrode leads 140 within the pouch.

In addition, the secondary battery 100 according to the first aspect of the present disclosure may further include a temperature sensor 160 that senses a temperature.

In more detail, referring to FIG. 3, the electrode assembly 120 may be a chargeable and dischargeable power generation element and may include electrodes 123 and separators 124, which are alternately stacked.

The electrodes 123 may include a positive electrode 121 and a negative electrode 122. Here, the electrode assembly 120 may have a structure in which a positive electrode 121, a separator 124, and a negative electrode 122 are alternately laminated.

The positive electrode 121 and the negative electrode 122 may be provided in the shape of rectangular plates and be stacked in one direction and also may face each other with a separator 124 therebetween.

The positive electrode 121 may include a positive electrode collector and a positive electrode active material stacked on the positive electrode collector.

The positive electrode collector may be made of an aluminum foil.

The positive electrode active material may include lithium manganese oxide, lithium cobalt oxide, lithium nickel oxide, lithium iron phosphate, or a compound or mixture containing at least one of the above-described materials.

The negative electrode 122 may include a negative electrode collector and a negative electrode active material stacked on the negative electrode collector.

The negative electrode collector may be made of, for example, a foil made of a copper (Cu) material.

The negative active material may be a compound or a mixture containing a graphite-based material.

The separator 124 is made of an insulation material to electrically insulate the positive electrode 121 from the negative electrode 122. Here, the separator 124 may be made of a polyolefin-based resin film such as polyethylene or polypropylene having micropores.

The electrode assembly 120 may further include electrode tabs 130 provided on an end of the electrodes 123. Here, when a plurality of electrodes 123 are provided in the electrode assembly 120, electrode tabs 130 may be provided on each of the electrodes 123.

The electrode tabs 130 may include a positive electrode tab 131 provided on an end of the positive electrode 121 and a negative electrode tab 132 provided on an end of the negative electrode 122. Here, for example, the positive electrode tab 131 may be provided on an end of one side of the positive electrode 121, and the negative electrode tab 132 may be provided on an end of the other side of the negative electrode 122.

The pouch 110 may have an accommodation part 111a therein to accommodate the electrode assembly 120 therein.

In addition, the pouch 110 includes a body 111, in which the accommodation part 111a accommodating the electrode assembly 120 is provided, and a sealing part 112 sealed at an edge of the body 111.

A sealing part 112 may be disposed on an outer circumferential surface of the secondary battery 100 and may be formed through thermal compression. Here, the pouch 110 may include an upper case 110a and a lower case 110b, and a sealing part 112 may be formed by sealing outer circumferential surfaces of the upper case 110a and the lower case 110b. Here, a portion of the electrode leads 140, which is between the outer circumferential surface of the upper case 110a and the outer circumferential surface of the lower case 110b, may be sealed together with the outer circumferential surfaces of the upper case 110a and the lower case 110b. Thus, the electrode leads 140 may be fixed to the pouch 110 by a sealing part 112.

In addition, the pouch 110 may include a flexible material. Here, the pouch 110 may include a first insulating layer, an aluminum (Al) sheet, and a second insulating layer, which are stacked from the inside to the outside.

The first insulating layer may include an insulating material. Here, the first insulating layer may include a resin material.

A second insulating coating layer may include an insulating material. Here, the second insulating coating layer may include a nylon layer containing a nylon material and a resin layer containing a resin material.

The electrode leads 140 may be provided in plurality, be connected to both sides of the electrode assembly 120, and extend to the outside of the pouch so that the electrode assembly 120 is electrically connected to the outside. Here, the plurality of electrode leads 140 may be fixed to a sealing part 112 disposed on the outer circumferential surface of the pouch 110.

Here, the plurality of electrode leads 140 may include a positive electrode lead 141 connected to a positive electrode 121 and a negative electrode lead 142 connected to a negative electrode 122.

A positive electrode lead 141 may extend from one side of the electrode assembly 120, and a negative electrode lead 142 may extend from the other side of the electrode assembly 120. In addition, the positive lead 141 may be electrically connected to the positive electrode 121 through a positive electrode tab 131, and the negative lead 142 may be electrically connected to the negative electrode 122 through a negative electrode tab 132. Here, the positive electrode tab 131 may be connected to a first portion of the positive electrode lead 141, and the negative electrode tab 132 may be connected to a first portion of the negative lead 142. Here, each ends of the support 150 may be connected to the second portions of the positive lead 141 and the negative lead 142, respectively. Here, the first portions may be disposed outside the second portions.

In addition, the plurality of electrode leads 140 may extend in a longitudinal direction of the pouch 110.

Figure 4:
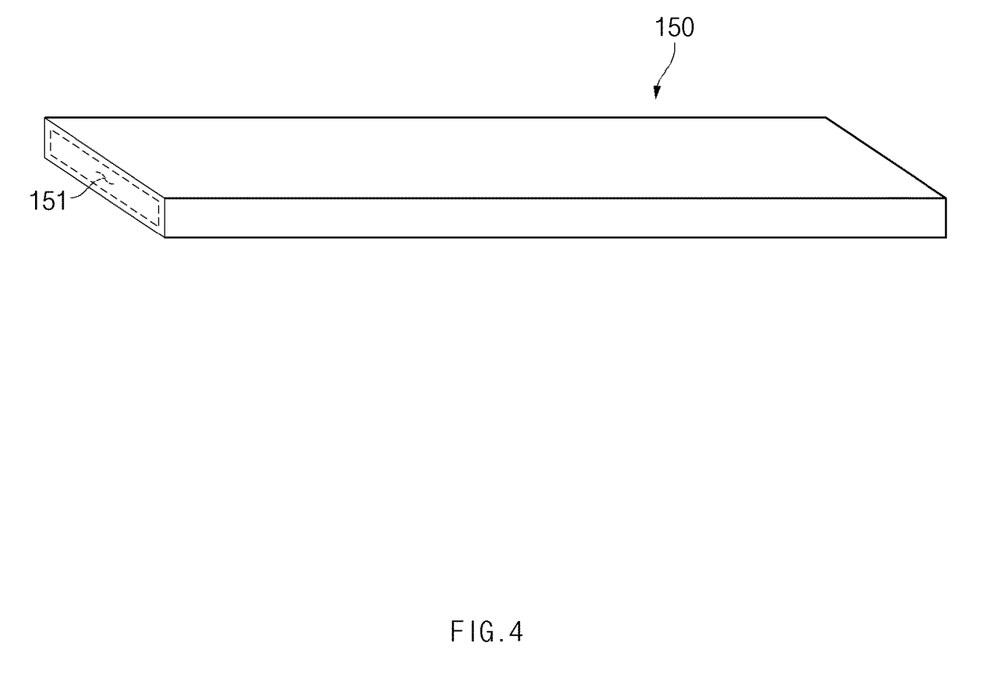
FIG. 4 is a perspective view of a support in the secondary battery according to the first aspect of the present disclosure.

FIG. 4 is a perspective view of a support in the secondary battery according to the first aspect of the present disclosure.

Referring to FIGS. 3 and 4, the support 150 may support the electrode assembly 120 by connecting the plurality of electrode leads 140 to both ends thereof within the pouch 110.

In addition, the support 150 may include a non-conductive material. Here, the support 150 may include, for example, heat-dissipating plastic or heat-dissipating resin material. Here, the heat-dissipating plastic may specifically include, for example, thermally-conductive plastic. In addition, the heat-dissipating resin may specifically include, for example, a thermally conductive resin.

The support 150 may include a support part having certain strength or higher to enable a support function and a coating part applied on an outer surface of the support part so as not to react with an electrolyte. Here, for example, the support part may include an epoxy resin, which has mechanical strength for the supporting, has high thermal conductivity, and includes an insulating material, and the coating portion may include, for example, silicone, which has chemical resistance and is an insulating material.

In addition, the support 150 may be provided in the form of a hollow tube. Here, the support 150 may be provided, for example, in the shape of a rectangular tube. Thus, a surface of the support 150, which is in contact with the electrode assembly 120, may provide a rectangular contact surface to efficiently support the electrode assembly 120.

In addition, one end of the support 150 may be fixed to a lower side of the end of the positive electrode lead 141, and the other end of the support 150 may be fixed to a lower side of the end of the negative electrode lead 142.

In addition, the support 150 may be disposed between a positive electrode 121 and a negative electrode 122. That is, the support 150 may be stacked between a positive electrode 121 and a negative electrode 122 in the form of rectangular plates, which are stacked in a direction. Here, the support 150 may, for example, face a positive electrode 121 and a negative electrode 122 with separators 124 therebetween. As another example, the support 150 may be made of an insulating material and directly face a positive electrode 121 and a negative electrode 122.

Furthermore, the support 150 may pass through a central part of the electrode assembly 120. Here, the support 150 may pass through the central part of the electrode assembly 120 in the stacking direction. That is, the support 150 may, for example, pass through the electrode assembly 120 in the horizontal direction to support the electrode assembly 120 when the electrodes 123 and the separators 124 are alternately stacked in a vertical direction.

The support 150 may, for example, transfer heat generated in the electrode assembly 120 to the electrode lead 140. That is, high heat generated at a portion of the electrode assembly 120 around the support 150 may be transferred to the electrode leads 140, and the surroundings may be cooled through heat dissipation that transfers heat to the outside through the electrode leads 140.

In addition, as another example, the support 150 may have an accommodation space 151, in which coolant is accommodated, to cool the surroundings. That is, the coolant such as cooling water may be disposed inside the support 150 to cool the high heat generated in the electrode assembly 120 around the support 150. Here, the accommodation space 151 of the support 150 may be sealed or connected to a cooling water supply line disposed outside the pouch.

In addition, as another example, the support 150 may transfer the heat generated in the electrode assembly 120 to the electrode leads 140 to indirectly cool the surroundings and also may provide the accommodation space 151, in which the coolant is accommodated, to directly cool the surroundings.

Figure 5:
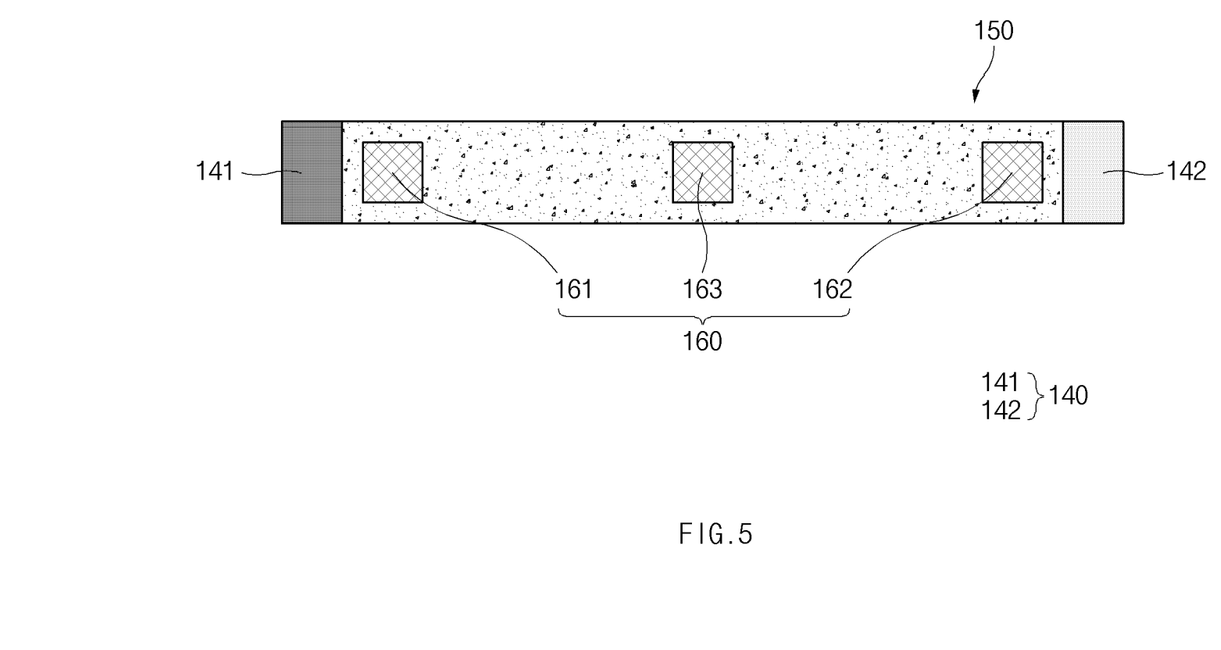
FIG. 5 is a plan view of the support and a temperature sensor according to the first aspect of the present disclosure.

FIG. 5 is a plan view of the support and a temperature sensor according to the first aspect of the present disclosure.

Referring to FIGS. 3 and 5, temperature sensors 160 may be provided on the support 150 to sense a surrounding temperature. Here, the temperature sensor 160 may be disposed, for example, in an outer surface of the support 150.

In addition, temperature sensor(s) 160 may include a first temperature sensor 161 and a second temperature sensor 162, which are provided at both ends of the support 150, and a third temperature sensor 163 provided at a central portion of the support 150. Thus, a temperature around the electrode tabs 130 or the electrode leads 140 may be sensed through the first temperature sensor 161 and the second temperature sensor 162, and a temperature at the central position of the electrode assembly 120 may be sensed through the third temperature sensor 163. Thus, temperature monitoring may be easy through the first temperature sensor 161, the second temperature sensor 162, and the third temperature sensor 163 to effectively manage the temperatures.

The secondary battery 100 according to the first aspect of the present disclosure configured as described above may include the support 150 that supports the electrode assembly 120 to firmly support the electrode assembly 120 from use environment such as vibration and impacts, thereby strengthening durability. Here, both ends of the support 150 may be connected to the positive electrode lead 141 and the negative electrode lead 142, respectively, and thus, the electrode assembly 120 may be supported more firmly.

In addition, the support 150 may transfer the heat generated in the electrode assembly 120 to the electrode lead 140 to cool the surroundings through the heat dissipation that transfers the heat to the outside through the electrode leads 140.

Furthermore, the coolant may be accommodated in the support 150 to cool the surroundings. In addition, the support 150 may be provided with temperature sensor(s) 160 that senses the surrounding temperature to effectively manage the internal temperature.

A battery pack may be configured to include the secondary battery 100 according to the first aspect of the present disclosure configured as described above.

Here, the battery pack may include a secondary battery 100 and a pack case that accommodates the secondary battery 100 therein. In addition, the battery pack may be a cell stack in which the plurality of secondary batteries 100 are stacked and may be accommodated in a pack case.

Secondary Battery According to Second Aspect

Hereinafter, a secondary battery according to a second aspect of the present disclosure will be described.

Figure 6:
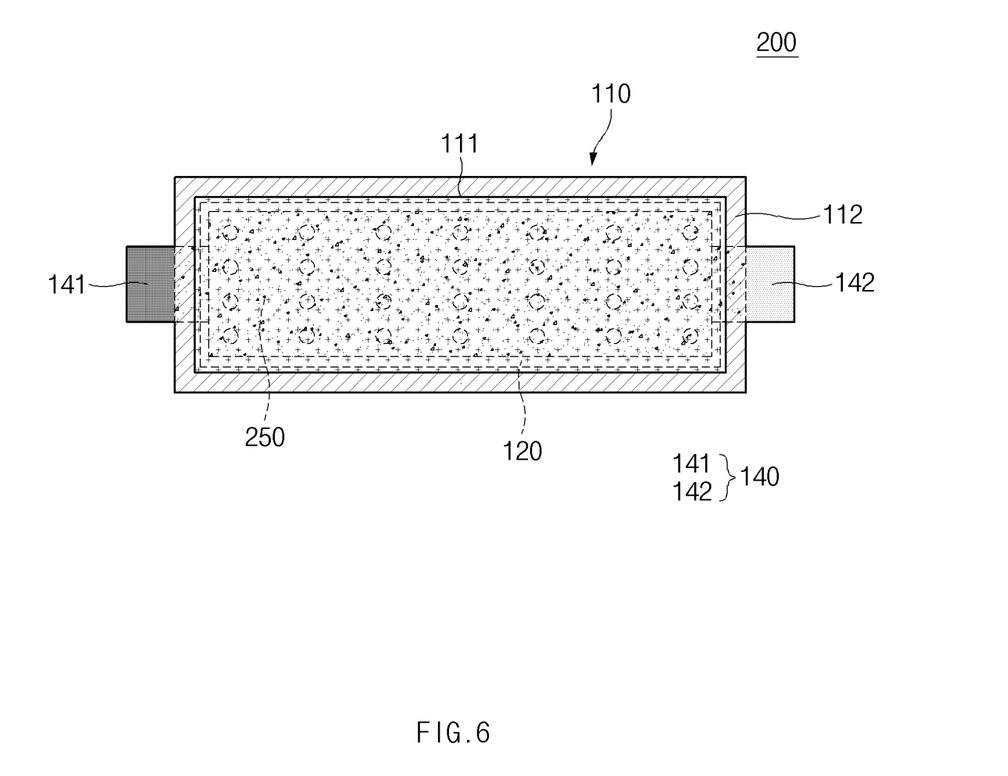
FIG. 6 is a plan view illustrating an example of the inside of a secondary battery according to a second aspect of the present disclosure.
Figure 7:
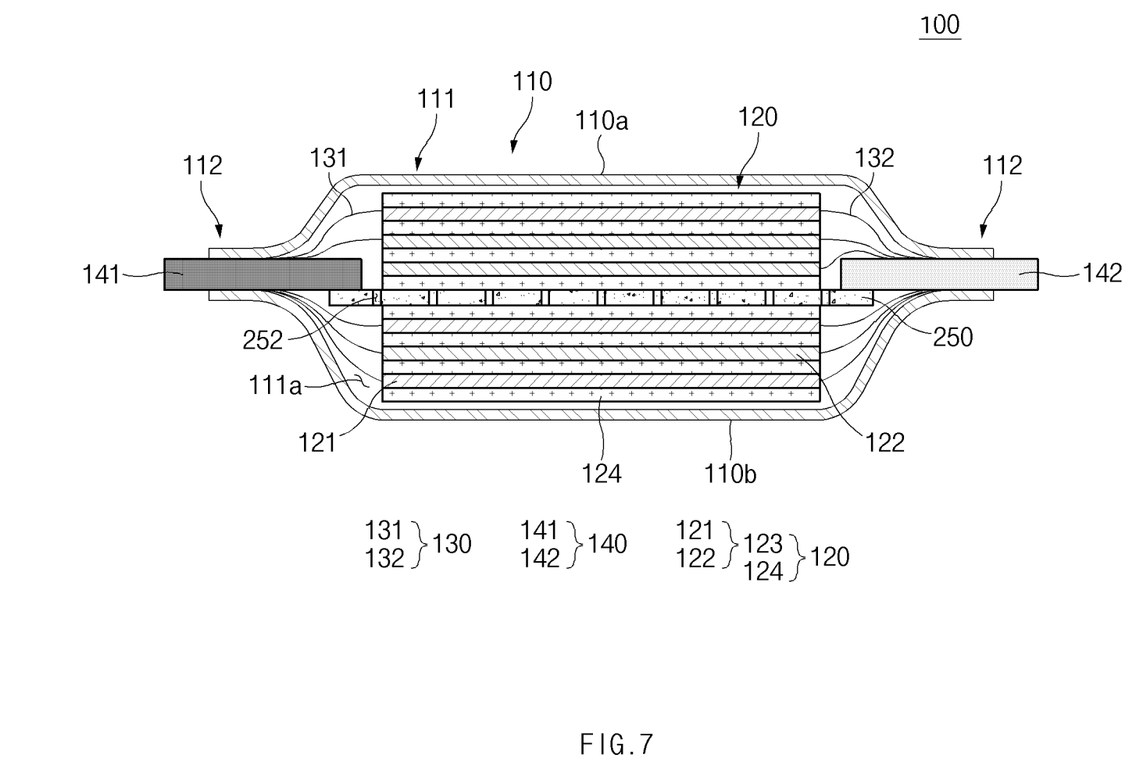
FIG. 7 is a side cross-sectional view illustrating a main part of the secondary battery according to the second aspect of the present disclosure.
Figure 8:
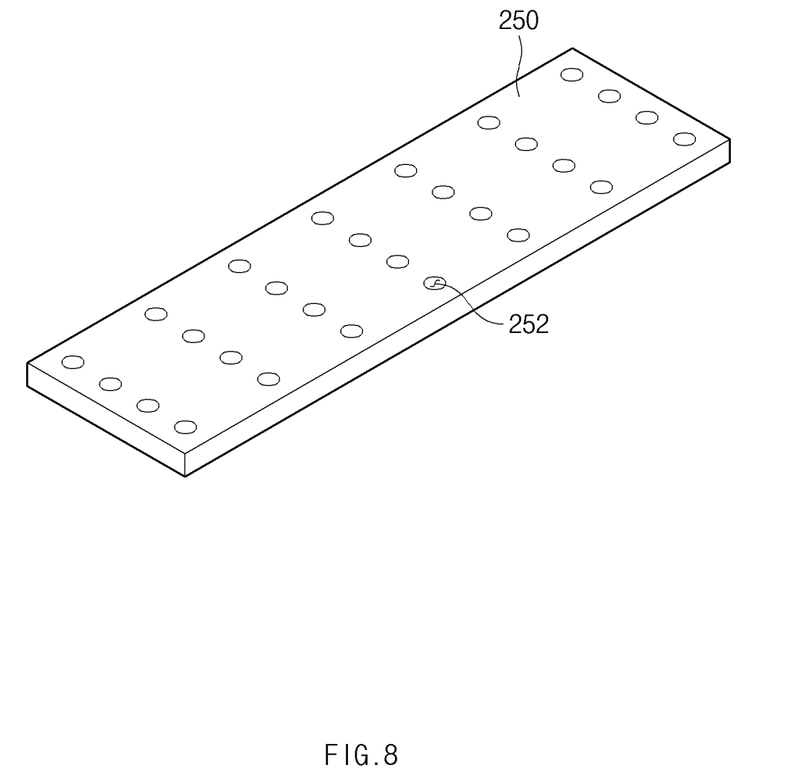
FIG. 8 is a perspective view of a support in the secondary battery according to the second aspect of the present disclosure.

FIG. 6 is a plan view illustrating an example of the inside of a secondary battery according to a second aspect of the present disclosure, FIG. 7 is a side cross-sectional view illustrating a main part of the secondary battery according to the second aspect of the present disclosure, and FIG. 8 is a perspective view of a support in the secondary battery according to the second aspect of the present disclosure.

Referring to FIGS. 6 to 8, a secondary battery 200 according to the second aspect of the present disclosure includes an electrode assembly 120, a pouch 110 in which the electrode assembly 120 is accommodated, a plurality of electrode leads 140 connected to the electrode assembly 120 to extend to the outside of the pouch 110, and a support 250 connected to the plurality of electrode leads 140 within the pouch. In addition, the secondary battery 200 according to the second aspect of the present disclosure may further include a temperature sensor (not shown) that senses a temperature.

The secondary battery 200 according to the second aspect of the present disclosure is the same as the secondary battery according to the first aspect except for a shape of the support 250. Thus, contents of this aspect, which are correspond with those according to the forgoing aspect, will be omitted or briefly described, and also, differences therebetween will be mainly described.

In more detail, the electrode assembly 120 may be a chargeable and dischargeable power generation element and may comprise electrodes 123 and separators 124, which are alternately stacked.

The electrodes 123 may include a positive electrode 121 and a negative electrode 122. Here, the electrode assembly 120 may have a structure in which a positive electrode 121, a separator 124, and a negative electrode 122 are alternately laminated.

The positive electrode 121 and the negative electrode 122 may be provided in the shape of rectangular plates and be stacked in a direction and also may face each other with a separator 124 therebetween.

The electrode assembly 120 may further include electrode tabs 130 provided on an end of the electrodes 123. Here, when a plurality of electrodes 123 are provided in the electrode assembly 120, electrode tabs 130 may be provided on each of the electrodes 123.

The electrode tabs 130 may include a positive electrode tab 131 provided on an end of the positive electrode 121 and a negative electrode tab 132 provided on an end of the negative electrode 122. Here, for example, the positive electrode tab 131 may be provided on an end of one side of the positive electrode 121, and the negative electrode tab 132 may be provided on an end of the other side of the negative electrode 122.

The pouch 110 may have an accommodation part 111*a* therein to accommodate the electrode assembly 120 therein.

In addition, the pouch 110 includes a body 111, in which the accommodation part 111*a* accommodating the electrode assembly 120 is provided, and a sealing part 112 sealed at an edge of the body 111.

a sealing part 112 may be disposed on an outer circumferential surface of the secondary battery 200 and may be formed through thermal compression. Here, the pouch 110 may include an upper case 110*a* and a lower case 110*b*, and a sealing part 112 may be formed by sealing outer circumferential surfaces of the upper case 110*a* and the lower case 110*b*. Here, a portion of the electrode leads 140, which is between the outer circumferential surface of the upper case 110*a* and the outer circumferential surface of the lower case 110*b*, may be sealed together with the outer circumferential surfaces of the upper case 110*a* and the lower case 110*b*. Thus, the electrode leads 140 may be fixed to the pouch 110 by a sealing part 112.

In addition, the pouch 110 may include a flexible material. Here, the pouch 110 may include a first insulating layer, an aluminum (Al) sheet, and a second insulating layer, which are stacked from the inside to the outside.

The electrode leads 140 may be provided in plurality, be connected to both sides of the electrode assembly 120, and extend to the outside of the pouch so that the electrode assembly 120 is electrically connected to the outside. Here, the plurality of electrode leads 140 may be fixed to a sealing part 112 disposed on the outer circumferential surface of the pouch 110.

Here, the plurality of electrode leads 140 may include a positive electrode lead 141 connected to a positive electrode 121 and a negative electrode lead 142 connected to a negative electrode 122.

A positive electrode lead 141 may extend from one side of the electrode assembly 120, and a negative electrode lead 142 may extend from the other side of the electrode assembly 120. In addition, the positive lead 141 may be electrically connected to the positive electrode 121 through a positive electrode tab 131, and the negative lead 142 may be electrically connected to the negative electrode 122 through a negative electrode tab 132. Here, the positive electrode tab 131 may be connected to a first portion of the positive electrode lead 141, and the negative electrode tab 132 may be connected to a first portion of the negative lead 142. Here, both ends of the support 150 may be connected to the second portions of the positive lead 141 and the negative lead 142, respectively. Here, the first portion may be disposed outside the second portion.

In addition, the plurality of electrode leads 140 may extend in a longitudinal direction of the pouch 110.

The support 250 may support the electrode assembly 120 by connecting the plurality of electrode leads 140 to both ends thereof within the pouch 110.

In addition, the support 250 may include a non-conductive material. Here, the support 250 may include, for example, heat-dissipating plastic or heat-dissipating resin material. Here, the heat-dissipating plastic may specifically include, for example, thermally-conductive plastic. In addition, the heat-dissipating resin may specifically include, for example, a thermally conductive resin.

Furthermore, the support (150, 250) may include a non-combustible material.

The support 250 may include a support part having certain strength or higher to enable a support function and a coating part applied on an outer surface of the support part so as not to react with an electrolyte. Here, for example, the support part may include an epoxy resin, which has mechanical strength for the supporting, has high thermal conductivity, and includes an insulating material, and the coating portion may include, for example, silicone, which has chemical resistance and is an insulating material.

Furthermore, the support 250 may have a plate shape. Here, the support 250 may be provided, for example, in the shape of a rectangular plate. Thus, a surface of the support 150, which is in contact with the electrode assembly 120, may provide a rectangular contact surface to more well support the electrode assembly 120. Here, the support 250 may have a plurality of through-holes 252. Here, the through-holes 252 may be defined to pass in a stacking direction. Thus, lithium ions, etc. may move through the through-holes 252.

In addition, one end of the support 250 may be fixed to a lower side of the end of the positive electrode lead 141, and the other end of the support 250 may be fixed to a lower side of the end of the negative electrode lead 142.

In addition, the support 250 may be disposed between a positive electrode 121 and a negative electrode 122. That is, the support 250 may be stacked between a positive electrode 121 and a negative electrode 122 in the form of rectangular plates, which are stacked in one direction. Here, the support 250 may, for example, face a positive electrode 121 and a negative electrode 122 with separators 124 therebetween. As another example, the support 250 may be made of an insulating material and directly face the positive electrode 121 and the negative electrode 122.

Furthermore, the support 250 may pass through a central part of the electrode assembly 120. Here, the support 250 may pass through the central part of the electrode assembly 120 in the stacking direction. That is, the support 250 may, for example, pass through the electrode assembly 120 in the horizontal direction to support the electrode assembly 120 when the electrodes 123 and the separators 124 are alternately stacked in a vertical direction.

The support 250 may transfer heat generated in the electrode assembly 120 to the electrode lead 140. That is, high heat generated at a portion of the electrode assembly 120 around the support 250 may be transferred to the electrode leads 140, and the surrounding may be cooled through heat dissipation that transfers heat to the outside through the electrode leads 140.

While the present disclosure has been particularly shown and described with reference to exemplary aspects thereof, it is to be understood that the scope of the present disclosure is not limited thereto. It will be understood by those of ordinary skill in the art that various changes in form and details may be made therein without departing from the spirit and scope of the present disclosure.

Furthermore, the scope of protection of the present disclosure will be clarified by the appended claims.

The invention claimed is:

1. A pouch-type secondary battery comprising:
an electrode assembly in which electrodes and separators are alternatively stacked;
a pouch in which the electrode assembly is accommodated;
a plurality of electrode leads connected to both side portions of the electrode assembly, respectively, to extend to the outside of the pouch; and
a support configured to connect the plurality of electrode leads,
wherein the plurality of electrode leads are fixed to a sealing part disposed on an outer circumferential surface of the pouch, and
both ends of the support are connected to the plurality of electrode leads to support the electrode assembly.

2. The pouch-type secondary battery of claim 1, wherein the support comprises a non-conductive material.

3. The pouch-type secondary battery of claim 1, wherein the support has an accommodation space in which coolant is accommodated, to cool surroundings.

4. The pouch-type secondary battery of claim 3, wherein the support is provided in the form of a rectangular tube.

5. The pouch-type secondary battery of claim 1, further comprising a temperature sensor configured to sense a surrounding temperature in the support.

6. The pouch-type secondary battery of claim 5, wherein the temperature sensor comprises:
a first temperature sensor and a second temperature sensor, which are provided at both ends of the support, respectively; and
a third temperature sensor provided at a central portion of the support.

7. The pouch-type secondary battery of claim 1, wherein the support passes through the electrode assembly.

8. The pouch-type secondary battery of claim 1, wherein the electrodes comprise a positive electrode and a negative electrode, and
the plurality of electrode leads comprise a positive electrode lead connected to the positive electrode and a negative electrode lead connected to the negative electrode,
wherein the positive electrode lead extends from one side of the electrode assembly, and the negative electrode lead extends from the other side of the electrode assembly, and
both ends of the support are connected to the positive electrode lead and the negative electrode lead, respectively.

9. The pouch-type secondary battery of claim 8, wherein one end of the support is fixed to a lower side of an end of the positive electrode lead, and
the other end of the support is fixed to a lower side of an end of the negative electrode lead.

10. The pouch-type secondary battery of claim 8, wherein the positive electrode and the negative electrode are provided in the form of rectangular plates, which are stacked in one direction, and face each other with the separator therebetween, and
the support is disposed between the positive electrode and the negative electrode.

11. The pouch-type secondary battery of claim 8, wherein the electrode assembly further comprises an electrode tab provided on an end of the electrode,
wherein the electrode tab comprises a positive electrode tab provided on an end of the positive electrode and a negative electrode tab provided on an end of the negative electrode, the positive electrode lead is electrically connected to the positive electrode through the positive electrode tab, the negative electrode lead is electrically connected to the negative electrode through the negative electrode tab, the positive electrode is connected to a first portion of the positive electrode lead, and the negative electrode tab is connected to a first portion of the negative electrode lead, and both ends of the support are connected to second portions of the positive electrode lead and the negative electrode lead.

12. The pouch-type secondary battery of claim 1, wherein the support is provided in the form of a plate.

13. The pouch-type secondary battery of claim 12, wherein the support has a plurality of through-holes.

14. The pouch-type secondary battery of claim 1, wherein the support is connected to the plurality of electrode leads within the pouch.

15. A battery pack comprising the pouch-type secondary battery of claim 1.

* * * * *